United States Patent
Araki

(10) Patent No.: US 9,718,926 B2
(45) Date of Patent: Aug. 1, 2017

(54) ROOM-TEMPERATURE-CURABLE ORGANOPOLYSILOXANE COMPOSITION, BUILDING SEALANT, ELECTRIC AND ELECTRONIC PART, AND AUTOMOBILE OIL SEAL USING CURED PRODUCT OF THE COMPOSITION

(71) Applicant: SHIN-ETSU CHEMICAL CO., LTD., Tokyo (JP)

(72) Inventor: Tadashi Araki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/915,124

(22) PCT Filed: Jun. 13, 2014

(86) PCT No.: PCT/JP2014/003155
§ 371 (c)(1),
(2) Date: Feb. 26, 2016

(87) PCT Pub. No.: WO2015/045221
PCT Pub. Date: Apr. 2, 2015

(65) Prior Publication Data
US 2016/0208152 A1 Jul. 21, 2016

(30) Foreign Application Priority Data

Sep. 30, 2013 (JP) ................................. 2013-204036

(51) Int. Cl.
| | |
|---|---|
| *C08G 77/08* | (2006.01) |
| *C08K 5/544* | (2006.01) |
| *C09K 3/10* | (2006.01) |
| *C08K 3/36* | (2006.01) |
| *C08L 83/04* | (2006.01) |
| *C08L 83/14* | (2006.01) |
| *C08K 5/098* | (2006.01) |
| *C08G 77/18* | (2006.01) |
| *C08G 77/50* | (2006.01) |

(52) U.S. Cl.
CPC ................ *C08G 77/08* (2013.01); *C08K 3/36* (2013.01); *C08K 5/544* (2013.01); *C08L 83/04* (2013.01); *C08L 83/14* (2013.01); *C09K 3/1018* (2013.01); *C08G 77/18* (2013.01); *C08G 77/50* (2013.01); *C08K 5/098* (2013.01)

(58) Field of Classification Search
CPC .................................................... C08G 77/08
See application file for complete search history.

(56) References Cited

U.S. PATENT DOCUMENTS

| | | | |
|---|---|---|---|
| 4,417,042 A | 11/1983 | Dziark | |
| 4,513,115 A | 4/1985 | Beers | |
| 2003/0069379 A1 | 4/2003 | Inoue et al. | |
| 2007/0088123 A1* | 4/2007 | Futatsumori | ............ C08L 83/04 524/863 |

(Continued)

FOREIGN PATENT DOCUMENTS

| | | |
|---|---|---|
| GB | 2116189 A | 9/1983 |
| JP | H0543803 A | 2/1993 |

(Continued)

OTHER PUBLICATIONS

Sep. 9, 2014 International Search Report issued in International Patent Application No. PCT/JP2014/003155.

(Continued)

*Primary Examiner* — Marc Zimmer
(74) *Attorney, Agent, or Firm* — Oliff PLC

(57) ABSTRACT

A room-temperature-curable organopolysiloxane composition contains as essential components (A) an organopolysiloxane shown by the following general formula (1), (B) an alkoxysilane shown by the following general formula (2) or a partial hydrolysate thereof, (C) a silazane compound shown by the following general formula (3), (D) a bismuth compound shown by the following general formula (4) which is in a liquid state at 20° C., a partial hydrolysate thereof, or both of them, (E) one or more fillers, and (F) a silane coupling agent having amine structure or imine structure, in which the composition satisfies [component (C)/component (B)≥1.0]. As a result, a room-temperature-curable organopolysiloxane composition has good curability and storage stability even without containing an organotin compound or an organotitanium compound, has safety in view of toxicity to the human body and environment, and exhibits good rubber physical properties and adhesion after curing.

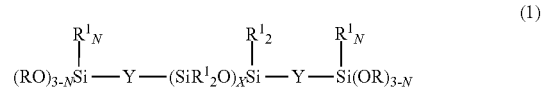

(1)

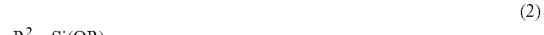

(2)

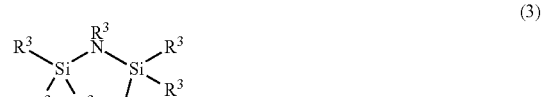

(3)

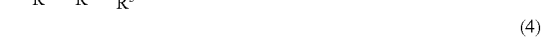

(4)

17 Claims, No Drawings

(56) References Cited

U.S. PATENT DOCUMENTS

| | | |
|---|---|---|
| 2011/0009558 A1 | 1/2011 | Maliverney et al. |
| 2016/0024258 A1* | 1/2016 | Pichl ........................ B01J 31/04 |
| | | 524/588 |

FOREIGN PATENT DOCUMENTS

| JP | H073160 A | | 1/1995 |
|---|---|---|---|
| JP | 2000017175 A | | 1/2000 |
| JP | 2000129126 A | | 5/2000 |
| JP | 2001-342363 A | | 12/2001 |
| JP | 2002088267 A | | 3/2002 |
| JP | 2003119387 A | | 4/2003 |
| JP | 3477120 B2 | | 12/2003 |
| JP | 3768072 B2 | | 4/2006 |
| JP | 2009-132797 | * | 6/2009 |
| JP | 2009-132797 A | | 6/2009 |
| JP | 2010163554 A | | 7/2010 |
| JP | 2011063792 A | | 3/2011 |
| JP | 2011509317 A | | 3/2011 |
| JP | 4676726 B2 | | 4/2011 |
| JP | 5053814 B2 | | 10/2012 |
| JP | 2012188674 A | | 10/2012 |

OTHER PUBLICATIONS

Apr. 5, 2016 International Preliminary Report on Patentability issued in International Patent Application No. PCT/JP2014/003155.
May 17, 2016 Office Action issued in Japanese Patent Application No. 2013-204036.
Apr. 24, 2017 extended European Search Report issued in Application No. 14849397.6.

* cited by examiner

ROOM-TEMPERATURE-CURABLE ORGANOPOLYSILOXANE COMPOSITION, BUILDING SEALANT, ELECTRIC AND ELECTRONIC PART, AND AUTOMOBILE OIL SEAL USING CURED PRODUCT OF THE COMPOSITION

TECHNICAL FIELD

The present invention relates to a room-temperature-curable organopolysiloxane composition, a building sealant, an electric and electronic part, and an automobile oil seal using a cured product of the composition.

BACKGROUND ART

A room-temperature-curable organopolysiloxane composition has been widely used for a condensation-curable silicone-based sealing agent, an adhesive, a composition for an automobile oil seal, and so on, in various fields such as building, electric and electronic field, transport aircraft, electrical component, and household appliance. Generally, the room-temperature-curable organopolysiloxane composition for these uses achieves good curability by adding an organotin compound or an organotitanium compound as a curing catalyst.

Recently, however, a product containing an organotin compound tends to be unfavorably used because of toxicity of this compound, and it has been forbidden in EU countries since 2012 to use the product containing the compound over 0.1% in terms of tin.

Moreover, when the composition contains an organotin compound, a main chain of the organopolysiloxane is cut, which causes problems of cracking and the reduction in hardness over time. When the composition contains an organotitanium compound, there are problems of low curing rate and discoloration that a resulting cured product (rubber) discolors over time.

For these problems, a composition curable without an organotin compound is in urgent need of development in recent years. As alternative compounds, many bismuth compounds have been studied.

Patent Document 1 describes that a divalent bismuth carboxylate is effective as a curing catalyst for a polyoxyalkylene polymer having a hydrolysable silicon group. Patent Document 2 describes that it is effective to use two compounds selected from a divalent organotin compound, a tetravalent organotin compound, and an organobismuth compound in combination. Furthermore, Patent Document 3 describes that it is effective to use both a Lewis acid and a bismuth compound, and Patent Document 4 describes that a carboxylate of a metal other than tin is effective. However, compositions disclosed in these Patent Documents exhibit insufficient curing rate, and there is no description regarding the application to silicone. Moreover, Patent Document 5 describes bismuth compounds as examples of a curing catalyst for a terminal urea-modified polymer, but fails to describe the application to silicone.

Patent Document 6 suggests that an organic polymer having hydrolysable silyl groups at terminal and side chain is cured by a mixed catalyst composed of a bismuth compound and a reaction product of carboxyl group with amino group so that the composition achieves fast curability. In this disclosure, deep-section curability and fast curability are improved by utilizing water which is a by-product of the ketimine formation with the carboxyl group and the amino group. However, although deep-section curability and fast curability are excellent, there are problems of discoloration due to the reaction product of the carboxyl group with the amino group and reduction in curing properties when the adding amount of the carboxyl group and the amino group are changed.

Patent Document 7 describes that it is effective to use both an iron chelate compound and a bismuth compound as curing catalysts, but since the iron chelate compound is a colored material, a problem that a resulting composition is colored occurs. Patent Document 8 suggests a composition in which a bismuth compound is applied to silicone as a catalyst. This composition can give good fast curability indeed, but has a problem that physical properties of a resulting cured product are changed over time.

Patent Document 9 describes that bismuth catalysts of chelate type are effective, but these catalysts have problems of low curing rate and poor availability. As to a two-component or multicomponent composition, Patent Documents 10 and 11 describe that it is effective to use a bismuth compound as a catalyst, but both cannot be applied to one packaging type. Moreover, Patent Document 10 fails to describe applications to silicone, and in Patent Document 11, since an iron compound is essential besides a bismuth compound, following problems occur: two catalysts are required, and thus the formulation is complicated; a resulting composition is colored, like Patent Document 7.

CITATION LIST

Patent Literature

Patent Document 1: Japanese Unexamined Patent publication (Kokai) No. 2000-129126
Patent Document 2: Japanese Unexamined Patent publication (Kokai) No. 2002-088267
Patent Document 3: Japanese Patent No. 4676726
Patent Document 4: Japanese Unexamined Patent publication (Kokai) No. 2010-163554
Patent Document 5: Japanese Unexamined Patent publication (Kokai) No. 2012-188674
Patent Document 6: Japanese Patent No. 3768072
Patent Document 7: Japanese Unexamined Patent publication (Kokai) No. 2011-063792
Patent Document 8: Japanese Unexamined Patent publication (Kokai) No. 2003-119387
Patent Document 9: Japanese Unexamined Patent publication (Kokai) No. 2011-509317
Patent Document 10: Japanese Patent No. 3477120
Patent Document 11: Japanese Patent No. 5053814

SUMMARY OF INVENTION

Technical Problem

The present invention was accomplished in view of the above circumstances. It is an object of the present invention to provide a room-temperature-curable organopolysiloxane composition having good curability and storage stability even without containing an organotin compound or an organotitanium compound, having safety in view of toxicity to the human body and environment, and exhibiting good rubber physical properties and adhesion after curing.

Solution to Problem

To solve the foregoing problems, the present invention provides a room-temperature-curable organopolysiloxane composition comprising as essential components:

(A) 100 parts by mass of an organopolysiloxane shown by the following general formula (1), having a viscosity at 23° C. of 50 to 50,000 mPa·s,

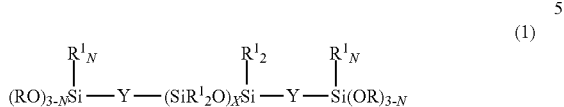

(1)

wherein R represents a methyl group or an ethyl group, $R^1$ represents a substituted or unsubstituted monovalent hydrocarbon group having 1 to 10 carbon atoms, X represents an integer of 10 or more, Y represents an oxygen atom or an alkylene group having 1 to 5 carbon atoms, and N independently represents an integer of 0 or 1;

(B) 0.1 to 5 parts by mass of an alkoxysilane shown by the following general formula (2) or a partial hydrolysate thereof,

(2)

wherein R has the same meaning as above, $R^2$ represents a vinyl group, a halogen-substituted alkyl group, or an alkyl group having 1 to 6 carbon atoms, and n represents an integer of 2 to 4;

(C) 0.5 to 10 parts by mass of a silazane compound shown by the following general formula (3),

(3)

wherein $R^3$ represents a hydrogen atom, an alkyl group having 1 to 3 carbon atoms, or a vinyl group, and all $R^3$ may be the same or different;

(D) 0.01 to 5 parts by mass of a bismuth compound shown by the following general formula (4) which is in a liquid state at 20° C., a partial hydrolysate thereof, or both of them, $$\text{Bi}(\text{OCOR}^4)_3 \quad (4)$$

wherein $R^4$ represents a substituted or unsubstituted monovalent hydrocarbon group having 1 to 20 carbon atoms;

(E) 1 to 300 parts by mass of one or more fillers; and (F) 0.05 to 15 parts by mass of a silane coupling agent having one or more amine structures or imine structures per molecule;

a mass ratio of the component (C) to the component (B) satisfying [component (C)/component (B)≥1.0].

Such a room-temperature-curable organopolysiloxane composition has good curability and storage stability even without containing an organotin compound or an organotitanium compound, has safety in view of toxicity to the human body and environment since an organotin compound is not contained, and exhibits good rubber physical properties and adhesion after curing.

In this case, the bismuth compound of the component (D) is preferably either or both of bismuth tris(2-ethylhexanoate) and bismuth tris(neodecanoate).

Such a bismuth compound enables the room-temperature-curable organopolysiloxane composition to have better fast curability and deep-section curability.

In this case, the silane coupling agent of the component (F) preferably contains any of silane coupling agents shown by the following general formulae (5) to (9),

(5)

(6)

(7)

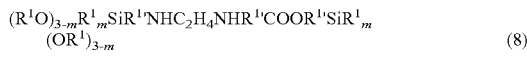

(8)

(9)

wherein $R^1$ has the same meaning as above, $R^{1\prime}$ represents a substituted or unsubstituted divalent hydrocarbon group having 1 to 10 carbon atoms, and m represents an integer selected from 0, 1, and 2.

Such a silane coupling agent enables the room-temperature-curable organopolysiloxane composition to have good adhesion to various substrates while keeping good curability.

Furthermore, the present invention provides a building sealant using a cured product of the above room-temperature-curable organopolysiloxane composition.

Furthermore, the present invention provides an electric and electronic part using a cured product of the above room-temperature-curable organopolysiloxane composition.

Furthermore, the present invention provides an automobile oil seal using a cured product of the above room-temperature-curable organopolysiloxane composition.

Thus, a cured product of the room-temperature-curable organopolysiloxane composition of the present invention can be suitably used for a building sealant, an electric and electronic part, an automobile oil seal, etc.

Advantageous Effects of Invention

As mentioned above, the room-temperature-curable organopolysiloxane composition of the present invention can be used as a room-temperature-curable organopolysiloxane composition of one packaging type that has good curability and storage stability even without containing a conventionally used condensation-reaction catalyst such as an organotin compound or an organotitanium compound. Furthermore, this room-temperature-curable organopolysiloxane composition has safety in view of toxicity to the human body and environment since an organotin compound is not contained. In addition, the room-temperature-curable organopolysiloxane composition exhibits good rubber physical properties and adhesion after curing, so that it is suitably used for, especially, a building sealant, an electric and electronic part, an automobile oil seal, etc.

DESCRIPTION OF EMBODIMENTS

As mentioned above, it is desired to develop a room-temperature-curable organopolysiloxane composition that does not contain an organotin compound thereby exhibiting safety in view of toxicity to the human body and environment, has good curability and storage stability even without containing an organotin compound or an organotitanium compound, and is curable into a cured product having good rubber physical properties and adhesion.

The present inventors diligently study to accomplish the above objects and consequently found that when to (A) an organopolysiloxane shown by the following general formula (1) in which both terminals are blocked with alkoxy groups are added (B) an alkoxysilane shown by the following general formula (2) and (C) a silazane compound shown by the following general formula (3) so as to satisfy [component (C)/component (B)≥1.0], and (D) a bismuth compound shown by the following general formula (4) which is in a liquid state at 20° C., a partial hydrolysate thereof, or both of them are used as catalyst, a composition exhibiting good curability can be obtained even without containing an organotin compound or an organotitanium compound conventionally used as a condensation-reaction catalyst, thereby brought the present invention to completion.

That is, the present invention is a room-temperature-curable organopolysiloxane composition comprising as essential components:

(A) 100 parts by mass of an organopolysiloxane shown by the following general formula (1), having a viscosity at 23° C. of 50 to 50,000 mPa·s,

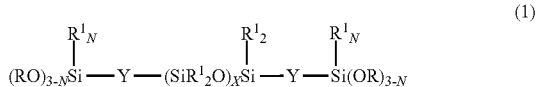

wherein R represents a methyl group or an ethyl group, $R^1$ represents a substituted or unsubstituted monovalent hydrocarbon group having 1 to 10 carbon atoms, X represents an integer of 10 or more, Y represents an oxygen atom or an alkylene group having 1 to 5 carbon atoms, and N independently represents an integer of 0 or 1;

(B) 0.1 to 5 parts by mass of an alkoxysilane shown by the following general formula (2) or a partial hydrolysate thereof,

wherein R has the same meaning as above, $R^2$ represents a vinyl group, a halogen-substituted alkyl group, or an alkyl group having 1 to 6 carbon atoms, and n represents an integer of 2 to 4;

(C) 0.5 to 10 parts by mass of a silazane compound shown by the following general formula (3),

wherein $R^3$ represents a hydrogen atom, an alkyl group having 1 to 3 carbon atoms, or a vinyl group, and all $R^3$ may be the same or different;

(D) 0.01 to 5 parts by mass of a bismuth compound shown by the following general formula (4) which is in a liquid state at 20° C., a partial hydrolysate thereof, or both of them,

wherein $R^4$ represents a substituted or unsubstituted monovalent hydrocarbon group having 1 to 20 carbon atoms;

(E) 1 to 300 parts by mass of one or more fillers; and (F) 0.05 to 15 parts by mass of a silane coupling agent having one or more amine structures or imine structures per molecule;

a mass ratio of the component (C) to the component (B) satisfying [component (C)/component (B)≥1.0].

Hereinafter, the present invention will be described in detail, but the present invention is not limited thereto.

Herein, "viscosity" is a value measured with a rotational viscometer under condition of 23° C.

[Component (A)]

The component (A) used in the room-temperature-curable organopolysiloxane composition of the present invention serves as a base polymer of the inventive composition. In the present invention, an organopolysiloxane having hydrolysable groups at terminals is essential as the base polymer since a bismuth catalyst of the component (D) described later is used as a curing catalyst.

As such an organopolysiloxane, the present invention uses an organopolysiloxane shown by the following general formula (1), having a viscosity at 23° C. of 50 to 50,000 mPa·s,

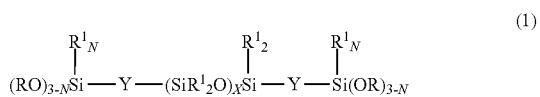

wherein R represents a methyl group or an ethyl group, $R^1$ represents a substituted or unsubstituted monovalent hydrocarbon group having 1 to 10 carbon atoms, X represents an integer of 10 or more, Y represents an oxygen atom or an alkylene group having 1 to 5 carbon atoms, and N independently represents an integer of 0 or 1.

In the general formula (1), R represents a methyl group or an ethyl group, preferably a methyl group.

$R^1$ represents a substituted or unsubstituted monovalent hydrocarbon group having 1 to 10 carbon atoms, preferably 1 to 6 carbon atoms. Examples of $R^1$ include alkyl groups such as a methyl group, an ethyl group, and a propyl group, cycloalkyl groups such as a cyclohexyl group, and groups in which hydrogen bonds of these groups are partially substituted with halogen atoms or other substituents, such as a 3,3,3-trifluoropropyl group. Among them, a methyl group, an ethyl group, a vinyl group, a phenyl group, and a 3,3,3-trifluoropropyl group are preferable, and a methyl group is particularly preferable. Multiple $R^1$ in the general formula (1) may be the same groups or different groups.

In the general formula (1), X represents an integer of 10 or more, preferably 50 to 2,000.

In the general formula (1), Y represents an oxygen atom or an alkylene group having 1 to 5 carbon atoms. Examples of the alkylene group include a methylene group, an ethylene group, a propylene group, and a butylene group. Among them, an oxygen atom and an ethylene group are preferable, and an oxygen atom is more preferable.

In the general formula (1), N represents an integer of 0 or 1; use of an organopolysiloxane wherein N is 0 allows the room-temperature-curable organopolysiloxane composition of one packaging type to have more excellent fast curability.

In addition, the component (A) has a viscosity at 23° C. of 50 to 50,000 mPa·s, preferably 1,000 to 30,000 mPa·s. When the viscosity is less than 50 mPa·s, there is fear that the curability is extremely deteriorated and excellent physical properties, particularly, flexibility and impact resistance cannot be given to an elastomer after curing; when the viscosity is more than 50,000 mPa·s, viscosity of the composition is so high that flowability may be significantly lowered.

[Component (B)]

The component (B) used in the room-temperature-curable organopolysiloxane composition of the present invention is an alkoxysilane shown by the following general formula (2) or a partial hydrolysate thereof, which functions as a cross-linker in the inventive composition,

wherein R has the same meaning as above, $R^2$ represents a vinyl group, a halogen-substituted alkyl group, or an alkyl group having 1 to 6 carbon atoms, and n represents an integer of 2 to 4.

In the general formula (2), R is the same as R in the general formula (1).

$R^2$ may be the same or different, and represents a vinyl group, a halogen-substituted alkyl group, or an alkyl group having 1 to 6 carbon atoms; among them, a vinyl group is particularly preferable.

n represents an integer of 2 to 4; among them, 3 is particularly preferable.

Illustrative examples of the component (B) include ethyl silicate, propyl silicate, methyltrimethoxysilane, methyltriethoxysilane, vinyltrimethoxysilane, vinyltriethoxysilane, methyl tris(methoxyethoxy)silane, vinyl tris(methoxyethoxy)silane, methyl tripropenoxysilane, and partial hydrolysates thereof.

The crosslinker of the component (B) may be any of silane and siloxane obtained by partial hydrolysis of the silane. The siloxane may be any of linear, branched, or cyclic. Moreover, one kind thereof may be used alone or two or more kinds may be used at the same time. Above all, alkoxysilane with low content of partial hydrolysate is preferably used as the component (B) to provide faster curability.

The formulation amount of the component (B) is 0.1 to 5 parts by mass, preferably 0.3 to 3 parts by mass, based on 100 parts by mass of the component (A). When the formulation amount is less than 0.1 part by mass, the composition may gelate during production or storage of the composition, and a cured product obtained from the composition cannot exhibit desired physical properties; when the formulation amount is more than 5 parts by mass, there is fear that curability of the composition is deteriorated and the composition is not cured as well as the shrinkage rate at curing is increased and the cured product exhibits low elasticity.

[Component (C)]

The component (C) used in the room-temperature-curable organopolysiloxane composition of the present invention is a silazane compound shown by the following general formula (3), which is an essential component to give fast curability, good storage stability, thixotropy, and discharge property to the inventive composition,

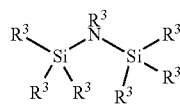

(3)

wherein $R^3$ represents a hydrogen atom, an alkyl group having 1 to 3 carbon atoms, or a vinyl group, and all $R^3$ may be the same or different.

Conventionally, the component (C) is generally used as a treatment agent for treating a hydroxyl group of a storage-stability-imparting agent, a filler, or the like. In the present invention, it is newly found that the component (C) functions as a promoter of the bismuth compound (catalyst) of the component (D) described later.

In the general formula (3), $R^3$ represents a hydrogen atom, an alkyl group having 1 to 3 carbon atoms, or a vinyl group; among them, a hydrogen atom, a methyl group, and an ethyl group are preferable, and a hydrogen atom and a methyl group are more preferable. All $R^3$ may be the same or different.

Illustrative examples of the component (C) include hexamethyldisilazane, hexaethyldisilazane, 1,3-divinyl-1,1,3,3-tetramethyldisilazane, 1,3-divinyl-1,1,3,3-tetraethyldisilazane, heptamethyldisilazane, and 1,1,3,3-tetraethyldisilazane; one kind thereof may be used alone or two or more kinds may be used at the same time.

The formulation amount of the component (C) is 0.5 to 10 parts by mass, preferably 0.7 to 7 parts by mass, based on 100 parts by mass of the component (A). When the formulation amount is less than 0.5 part by mass, there is fear that not only an expected curability cannot be obtained, but also the composition gelates during storage, and the discharge property is lowered; when the formulation amount is more than 10 parts by mass, curability of the composition is remarkably deteriorated, and much by-product gas is produced during curing.

The ratio (mass ratio) of the component (C) to the component (B) is [component (C)/component (B)≥1.0], that is, the adding amount (mass) of the component (C) needs to be equal to or more than the amount of the component (B). In the case of [component (C)/component (B)<1.0], i.e., when the component (B) exceeds the component (C), there is fear that not only an expected curability cannot be obtained, but also a cured product having rubber elasticity cannot be obtained.

[Component (D)]

The component (D) used in the room-temperature-curable organopolysiloxane composition of the present invention functions as a catalyst, and is an essential component to give good fast curability and deep-section curability to the inventive composition. The component (D) is a bismuth compound shown by the following general formula (4) which is in a liquid state at 20° C., a partial hydrolysate thereof, or both of them,

$$Bi(OCOR^4)_3 \qquad (4)$$

wherein $R^4$ represents a substituted or unsubstituted monovalent hydrocarbon group having 1 to 20 carbon atoms.

In the general formula (4), $R^4$ represents a substituted or unsubstituted monovalent hydrocarbon group having 1 to 20 carbon atoms, preferably a substituted or unsubstituted monovalent hydrocarbon group having 6 to 14 carbon atoms.

The bismuth compound of the component (D) is limited to a compound that is in a liquid state at 20° 0. This is because when the compound is in a solid state at 20° C., catalyst performance to react with moisture in the air is remarkably lowered, and the appearance becomes bad.

There is no specific limitation provided that the compound is in a liquid state at 20° C., but particularly, bismuth tris(2-ethylhexanoate) or bismuth tris(neodecanoate) is preferable because the composition can achieve better fast curability and deep-section curability.

The formulation amount of the component (D) is 0.01 to 5 parts by mass, preferably 0.05 to 3 parts by mass, based on 100 parts by mass of the component (A). When the formulation amount is less than 0.01 part by mass, expected curability and deep-section curability cannot be obtained; formulation amount exceeding 5 parts by mass causes deteriorated adhesion and disadvantage in cost.

[Component (E)]

The component (E) used in the room-temperature-curable organopolysiloxane composition of the present invention is one or more fillers, which functions as a reinforcing agent and an extending agent in the inventive composition. Examples of the filler include surface-treated or untreated aerosol silica, wet silica, precipitated silica, metal oxide, surface-treated or untreated heavy calcium carbonate, surface-treated or untreated colloidal calcium carbonate, metal hydroxide, glass bead, glass balloon, resin bead, and resin balloon; in particular, aerosol silica, precipitated silica, and calcium carbonate are preferably used.

The formulation amount of the component (E) is 1 to 300 parts by mass, preferably 5 to 150 parts by mass, based on 100 parts by mass of the component (A). When the formulation amount is less than 1 part by mass, effects as a reinforcing agent and an extending agent cannot be obtained; when the formulation amount is more than 300 parts by mass, the composition exhibits lowered discharge property and deteriorated workability.

[Component (F)]

The component (F) used in the room-temperature-curable organopolysiloxane composition of the present invention is a silane coupling agent having one or more amine structures or imine structures per molecule, which is an essential component to give the inventive composition good adhesion.

Illustrative examples of the component (F) include many silane coupling agents. Above all, a silane coupling agent containing any of silane coupling agents shown by the following general formulae (5) to (9) is preferably used. Use of such a silane coupling agent enables the composition to have good adhesion to various substrates while keeping good curability. Moreover, one kind thereof may be used alone or two or more kinds may be used at the same time.

$$(R^1O)_{3-m}R^1{}_mSiR^{1\prime}NH_2 \quad (5)$$

$$(R^1O)_{3-m}R^1{}_mSiR^{1\prime}N{=}CR^1{}_2 \quad (6)$$

$$(R^1O)_{3-m}R^1{}_mSiR^{1\prime}NHC_2H_4NH_2 \quad (7)$$

$$(R^1O)_{3-m}R^1{}_mSiR^{1\prime}NHC_2H_4NHR^{1\prime}COOR^{1\prime}SiR^1{}_m(OR^1)_{3-m} \quad (8)$$

$$(R^1O)_{3-m}R^1{}_mSiR^{1\prime}NHR^{1\prime}NHR^{1\prime}SiR^1{}_m(OR^1)_{3-m} \quad (9)$$

wherein $R^1$ has the same meaning as above, $R^{1\prime}$ represents a substituted or unsubstituted divalent hydrocarbon group having 1 to 10 carbon atoms, and m represents an integer selected from 0, 1, and 2.

The formulation amount of the component (F) is 0.05 to 15 parts by mass, preferably 0.5 to 5 parts by mass, based on 100 parts by mass of the component (A). When the formulation amount is less than 0.05 part by mass, there is fear that the curability is deteriorated and the adhesion is lowered; when the formulation amount is more than 15 parts by mass, a resulting cured product (rubber) is inferior in mechanical properties and disadvantageous in cost.

[Other Components]

In addition to the components (A) to (F), additives commonly known may be used in the room-temperature-curable organopolysiloxane composition of the present invention. Examples of the additives include polyether as a thixotropy-enhancer, isoparaffin as a plasticizer, network polysiloxane composed of trimethylsiloxy units and $SiO_2$ units as a crosslinking density-enhancer. If necessary, colorants such as pigments, dyes, and fluorescent whitening agents, bioactive additives such as antifungal agents, antimicrobial agents, cockroach repellents, and marine repellents, phenyl silicone oil and fluorosilicone oil as bleed oil, surface modifiers such as organic liquids incompatible with silicone, and solvents such as toluene, xylene, volatile oil solvents, cyclohexane, methylcyclohexane, and isoparaffin having low boiling point may be added.

Furthermore, the present invention provides a building sealant (sealing agent), an electric and electronic part, and an automobile oil seal using a cured product of the above room-temperature-curable organopolysiloxane composition.

A cured product of the room-temperature-curable organopolysiloxane composition of the present invention has good curability and storage stability, and exhibits good rubber physical properties and adhesion after curing, so that it is suitably used for a building sealant, an electric and electronic part, an automobile oil seal, etc.

As mentioned above, the room-temperature-curable organopolysiloxane composition of the present invention can be used as a room-temperature-curable organopolysiloxane composition of one packaging type that has good curability and storage stability even without containing a conventionally used condensation-reaction catalyst such as an organotin compound or an organotitanium compound. Furthermore, this room-temperature-curable organopolysiloxane composition has safety in view of toxicity to the human body and environment since an organotin compound is not contained.

In addition, the room-temperature-curable organopolysiloxane composition exhibits good rubber physical properties and adhesion after curing, so that it is suitably used for, especially, a building sealant, an electric and electronic part, an automobile oil seal, etc.

EXAMPLE

Hereinafter, the present invention will be specifically described with reference to examples and comparative examples, but the present invention is not limited thereto. The viscosity shows a value measured with a rotational viscometer at 23° C.

Example 1

To 100 parts by mass of (A) dimethylpolysiloxane both terminals of which are blocked with trimethoxysilyl groups, having a viscosity of 20,000 mPa·s, was added 10 parts by mass of (E) aerosol silica (product name: MU-215, available from Shin-Etsu Chemical Co., Ltd.) and fully mixed under a reduced pressure. Then, 1 part by mass of (B) vinyltrimethoxysilane and 1 part by mass of (C) hexamethyldisilazane were added thereto and fully mixed. Thereafter, 1 part by mass of (D) bismuth tris(2-ethylhexanoate) and 1 part by mass of (F) 3-aminopropyltriethoxysilane were added and uniformly mixed under a reduced pressure to obtain Composition 1. The mass ratio of the component (C) to the component (B), [component (C)/component (B)] (hereinafter the same), was [component (C)/component (3)=1.0].

Example 2

To 100 parts by mass of (A) dimethylpolysiloxane both terminals of which are blocked with trimethoxysilyl groups, having a viscosity of 20,000 mPa·s, was added 10 parts by mass of (E) aerosol silica (product name: MU-215, available from Shin-Etsu Chemical Co., Ltd.) and fully mixed under a reduced pressure. Then, 1 part by mass of (B) vinyltrimethoxysilane and 3 parts by mass of (C) hexamethyldisilazane were added thereto and fully mixed. Thereafter, 1 part by mass of (D) bismuth tris(2-ethylhexanoate) and 1 part by mass of (F) 3-aminopropyltriethoxysilane were added and uniformly mixed under a reduced pressure to obtain Composition 2, which exhibited [component (C)/component (B)=3.0].

Example 3

To 100 parts by mass of (A) dimethylpolysiloxane both terminals of which are blocked with trimethoxysilyl groups, having a viscosity of 20,000 mPa·s, was added 10 parts by mass of (E) aerosol silica (product name: MU-215, available from Shin-Etsu Chemical Co., Ltd.) and fully mixed under a reduced pressure. Then, 1 part by mass of (B) vinyltrimethoxysilane and 3 parts by mass of (C) hexamethyldisilazane were added thereto and fully mixed. Thereafter, 1 part by mass of (D) bismuth tris(neodecanoate) and 1 part by mass of (F) 3-aminopropyltriethoxysilane were added and uniformly mixed under a reduced pressure to obtain Composition 3, which exhibited [component (C)/component (B)=3.0].

Example 4

To 100 parts by mass of (A) dimethylpolysiloxane both terminals of which are blocked with trimethoxysilyl groups, having a viscosity of 20,000 mPa·s, was added 10 parts by mass of (E) aerosol silica (product name: MU-215, available from Shin-Etsu Chemical Co., Ltd.) and fully mixed under a reduced pressure. Then, 1 part by mass of (B) vinyltrimethoxysilane and 3 parts by mass of (C) hexamethyldisilazane were added thereto and fully mixed. Thereafter, 1 part by mass of (D) bismuth tris(2-ethylhexanoate) and 1 part by mass of (F) a silane coupling agent shown by the following general formula (10) were added and uniformly mixed under a reduced pressure to obtain Composition 4, which exhibited [component (C)/component (B)=3.0].

$$(CH_3O)_3Si(CH_2)_3N\!\!=\!\!C(CH_2CH(CH_3)_2)CH_3 \qquad (10)$$

Comparative Example 1

Composition 5 was obtained in the same manner as in Example 1 except that the formulation amount of (B) vinyltrimethoxysilane in Example 1 was changed to 3 parts by mass. The composition exhibited [component (C)/component (B)=0.33].

Comparative Example 2

Composition 6 was obtained in the same manner as in Example 1 except that (C) hexamethyldisilazane in Example 1 was not added.

Comparative Example 3

Composition 7 was obtained in the same manner as in Example 1 except that (B) vinyltrimethoxysilane in Example 1 was not added.

Comparative Example 4

Composition 8 was obtained in the same manner as in Example 1 except that 1 part by mass of lithium naphthenate was added in place of (D) bismuth tris(2-ethylhexanoate) in Example 1. The composition exhibited [component (C)/component (B)=1.0].

Comparative Example 5

Composition 9 was obtained in the same manner as in Example 1 except that 1 part by mass of zirconium 2-ethylhexanoate was added in place of (D) bismuth tris(2-ethylhexanoate) in Example 1. The composition exhibited [component (C)/component (B)=1.0].

The room-temperature-curable organopolysiloxane compositions (Compositions 1 to 9) of Examples 1 to 4 and Comparative examples 1 to 5 thus obtained were subjected to the following tests and evaluated.

(Fast Curability Test)

Tack-free time (touch dry time) was measured on Compositions 1 to 9 in accordance with the method provided in JIS A 5758. The result is shown in Table 1.

(Deep-Section Curability Test)

A glass dish having an inner diameter of 10 mm was filled with each Composition 1 to 9. After the composition was cured at 23° C.-50% RH for 24 hours, thickness of the composition cured from a part exposed to air was measured. The result is shown in Table 1.

(Rubber Physical Properties Test)

Compositions 1 to 9 were each poured into a 2-mm mold and cured at 23° C.·50% RH for 7 days to obtain a rubber sheet with a thickness of 2 mm. The rubber physical properties (hardness (Duro.A), cutting elongation, tensile strength) were then measured in accordance with JIS K 6249. The result is shown in Table 1.

(Adhesion Test)

Shearing adhesion samples having an adhesion area of 2.5 mm² and an adhesion thickness of 1 mm were produced by using Compositions 1 to 9 and aluminum adherend having a width of 25 mm and a length of 100 mm. After these samples were cured at 23° C.·50% RH for 7 days, aluminum shear adhesive strength and cohesive failure rate were measured. The result is shown in Table 1.

(Storage Stability Test)

Compositions 1 to 9 were left in uncured state under sealed condition at room temperature for 6 months. The resulting compositions were subjected to tests of fast curability, deep-section curability, rubber physical properties, and adhesion, in the same manner as mentioned above to evaluate storage stability. The result is shown in Table 1.

TABLE 1

|  |  | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|
| initial physical properties | tack-free time (min) | 11 | 13 | 15 | 12 | 10 | 12 | 13 | 10 | 15 |
|  | deep-section curability after 24 hr | 5.2 | 1.4 | 1.7 | 1.8 | 3.4 | 6.7 | 5.8 | 4.4 | 4.1 |
|  | hardness (Duro. A) | 15 | 16 | 18 | 18 | 7 | 10 | 15 | unmeasurable | unmeasurable |
|  | cutting elongation (%) | 320 | 480 | 420 | 450 | 510 | 150 | 490 | 40 | 50 |

TABLE 1-continued

| | | Example 1 | Example 2 | Example 3 | Example 4 | Comparative example 1 | Comparative example 2 | Comparative example 3 | Comparative example 4 | Comparative example 5 |
|---|---|---|---|---|---|---|---|---|---|---|
| | tensile strength (MPa) | 0.9 | 1.1 | 1.2 | 1.3 | 0.3 | 0.3 | 1.1 | 0.08 | 0.08 |
| | aluminum shear adhesive strength (MPa) | 0.7 | 0.8 | 0.7 | 0.8 | 0.2 | 0.1 | 0.8 | 0.01 | 0.01 |
| | cohesive failure rate (%) | 100 | 100 | 100 | 100 | 0 | 0 | 100 | 0 | 0 |
| after 6 months room temperature storage | tack-free time (min) | 13 | 13 | 15 | 12 | 20 | gelated | gelated | 8 | 8 |
| | deep-section curability after 24 hr | 5.4 | 1.2 | 1.6 | 1.4 | 1.6 | | | 4.3 | 4.5 |
| | hardness (Duro. A) | 17 | 16 | 19 | 17 | unmeasurable | | | unmeasurable | unmeasurable |
| | cutting elongation (%) | 300 | 460 | 400 | 400 | 50 | | | | |
| | tensile strength (MPa) | 1.0 | 1.2 | 1.1 | 1.2 | 0.08 | | | | |
| | aluminum shear adhesive strength (MPa) | 0.7 | 0.9 | 0.8 | 0.9 | unmeasurable | | | | |
| | cohesive failure rate (%) | 100 | 100 | 100 | 100 | 0 | | | | |

As shown in Table 1, Compositions 1 to 4 prepared in Examples 1 to 4 had good curability and were excellent in initial rubber physical properties and adhesion to aluminum. The comparison of Example 1 with Example 2 shows that the rubber physical properties were improved by increasing the formulation amount of the component (C). Furthermore, as to the storage stability, the curability and the rubber physical properties were not much changed, and the adhesion to aluminum was not lowered, even after room temperature storage for 6 months.

On the other hand, in Comparative examples 1 to 3, the formulation amount of vinyltrimethoxysilane of the component (B) was increased, the silazane compound of the component (C) was not added, and vinyltrimethoxysilane of the component (B) was not added, respectively. Therefore, these comparative examples were out of [component (C)/component (B)≥1.0], and thus the promoter effect of the silazane compound of the component (C) was decreased, and the hydrolysis rate by the bismuth catalyst was decreased, which leads to the reduction in curability, rubber physical properties, adhesion, and storage stability. In comparative examples 4 and 5, since the carboxylate of a metal other than a tin compound was used in place of the bismuth compound of the component (D), the curability was deteriorated and the rubber physical properties were lowered.

As mentioned above, the room-temperature-curable organopolysiloxane composition of the present invention can be used as a room-temperature-curable organopolysiloxane composition of one packaging type that has good curability and storage stability even without containing a conventionally used condensation-reaction catalyst such as an organotin compound or an organotitanium compound. Furthermore, this room-temperature-curable organopolysiloxane composition has safety in view of toxicity to the human body and environment since an organotin compound is not contained. In addition, the room-temperature-curable organopolysiloxane composition exhibits good rubber physical properties and adhesion after curing, so that it is suitably used for, especially, a building sealant, an electric and electronic part, an automobile oil seal, etc.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A room-temperature-curable organopolysiloxane composition comprising:
   (A) 100 parts by mass of an organopolysiloxane shown by the following general formula (1), having a viscosity at 23° C. of 50 to 50,000 mPa·s,

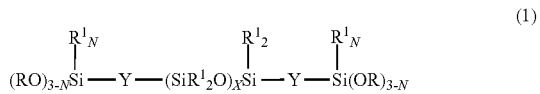

wherein R represents a methyl group or an ethyl group, $R^1$ represents a substituted or unsubstituted monovalent hydrocarbon group having 1 to 10 carbon atoms, X represents an integer of 10 or more, Y represents an oxygen atom or an alkylene group having 1 to 5 carbon atoms, and N independently represents an integer of 0 or 1;

(B) 0.1 to 5 parts by mass of an alkoxysilane shown by the following general formula (2) or a partial hydrolysate thereof, $$R^2{}_{4-n}Si(OR)_n \qquad (2)$$

wherein R has the same meaning as above, $R^2$ represents a vinyl group, a halogen-substituted alkyl group, or an alkyl group having 1 to 6 carbon atoms, and n represents an integer of 2 to 4;

(C) 0.5 to 10 parts by mass of a silazane compound shown by the following general formula (3),

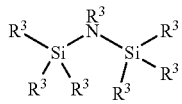
(3)

wherein $R^3$ represents a hydrogen atom, an alkyl group having 1 to 3 carbon atoms, or a vinyl group, and all $R^3$ may be the same or different;

(D) 0.01 to 5 parts by mass of a bismuth compound shown by the following general formula (4) which is in a liquid state at 20° C., a partial hydrolysate thereof, or both of them, $$Bi(OCOR^4)_3 \qquad (4)$$

wherein $R^4$ represents a substituted or unsubstituted monovalent hydrocarbon group having 1 to 20 carbon atoms;

(E) 1 to 300 parts by mass of one or more fillers; and
(F) 0.05 to 15 parts by mass of a silane coupling agent having one or more amine structures or imine structures per molecule;
a mass ratio of the component (C) to the component (B) satisfying [component (C)/component (B)≥1.0].

2. The room-temperature-curable organopolysiloxane composition according to claim 1, wherein the bismuth compound of the component (D) is either or both of bismuth tris(2-ethylhexanoate) and bismuth tris(neodecanoate).

3. The room-temperature-curable organopolysiloxane composition according to claim 1, wherein the silane coupling agent of the component (F) contains any of silane coupling agents shown by the following general formulae (5) to (9), $$(R^1O)_{3-m}R^1{}_mSiR^{1\prime}NH_2 \qquad (5)$$

$$(R^1O)_{3-m}R^1{}_mSiR^{1\prime}N{=}CR^1{}_2 \qquad (6)$$

$$(R^1O)_{3-m}R^1{}_mSiR^{1\prime}NHC_2H_4NH_2 \qquad (7)$$

$$(R^1O)_{3-m}R^1{}_mSiR^{1\prime}NHC_2H_4NHR^{1\prime}COOR^{1\prime}SiR^1{}_m(OR^1)_{3-m} \qquad (8)$$

$$(R^1O)_{3-m}R^1{}_mSiR^{1\prime}NHR^{1\prime}NHR^{1\prime}SiR^1{}_m(OR^1)_{3-m} \qquad (9)$$

wherein $R^1$ has the same meaning as above, $R^{1\prime}$ represents a substituted or unsubstituted divalent hydrocarbon group having 1 to 10 carbon atoms, and m represents an integer selected from 0, 1, and 2.

4. The room-temperature-curable organopolysiloxane composition according to claim 2, wherein the silane coupling agent of the component (F) contains any of silane coupling agents shown by the following general formulae (5) to (9), $$(R^1O)_{3-m}R^1{}_mSiR^{1\prime}NH_2 \qquad (5)$$

$$(R^1O)_{3-m}R^1{}_mSiR^{1\prime}N{=}CR^1{}_2 \qquad (6)$$

$$(R^1O)_{3-m}R^1{}_mSiR^{1\prime}NHC_2H_4NH_2 \qquad (7)$$

$$(R^1O)_{3-m}R^1{}_mSiR^{1\prime}NHC_2H_4NHR^{1\prime}COOR^{1\prime}SiR^1{}_m(OR^1)_{3-m} \qquad (8)$$

$$(R^1O)_{3-m}R^1{}_mSiR^{1\prime}NHR^{1\prime}NHR^{1\prime}SiR^1{}_m(OR^1)_{3-m} \qquad (9)$$

wherein $R^1$ has the same meaning as above, $R^{1\prime}$ represents a substituted or unsubstituted divalent hydrocarbon group having 1 to 10 carbon atoms, and m represents an integer selected from 0, 1, and 2.

5. A building sealant using a cured product of the room-temperature-curable organopolysiloxane composition according to claim 1.

6. A building sealant using a cured product of the room-temperature-curable organopolysiloxane composition according to claim 2.

7. A building sealant using a cured product of the room-temperature-curable organopolysiloxane composition according to claim 3.

8. A building sealant using a cured product of the room-temperature-curable organopolysiloxane composition according to claim 4.

9. An electric and electronic part using a cured product of the room-temperature-curable organopolysiloxane composition according to claim 1.

10. An electric and electronic part using a cured product of the room-temperature-curable organopolysiloxane composition according to claim 2.

11. An electric and electronic part using a cured product of the room-temperature-curable organopolysiloxane composition according to claim 3.

12. An electric and electronic part using a cured product of the room-temperature-curable organopolysiloxane composition according to claim 4.

13. An automobile oil seal using a cured product of the room-temperature-curable organopolysiloxane composition according to claim 1.

14. An automobile oil seal using a cured product of the room-temperature-curable organopolysiloxane composition according to claim 2.

15. An automobile oil seal using a cured product of the room-temperature-curable organopolysiloxane composition according to claim 3.

16. An automobile oil seal using a cured product of the room-temperature-curable organopolysiloxane composition according to claim 4.

17. The room-temperature-curable organopolysiloxane composition according to claim 1, wherein component (C)/component (B)≥3.0.

* * * * *